US008170402B2

(12) United States Patent
Frost-Ruebling et al.

(10) Patent No.: US 8,170,402 B2
(45) Date of Patent: *May 1, 2012

(54) PORTABLE HIGH CAPACITY DIGITAL DATA STORAGE DEVICE (75) Inventors: Steven G. Frost-Ruebling, San Francisco, CA (US); James Martin, Kitchener (CA)

(73) Assignee: Cinegest, Inc.

( * ) Notice: Subject to any disclaimer, the term of this patent is extended or adjusted under 35 U.S.C. 154(b) by 1435 days.

This patent is subject to a terminal disclaimer.

(21) Appl. No.: 11/453,669

(22) Filed: Jun. 15, 2006

(65) Prior Publication Data

US 2007/0236584 A1 Oct. 11, 2007

Related U.S. Application Data (60) Provisional application No. 60/790,132, filed on Apr. 7, 2006.

(51) Int. Cl.
*H04N 5/928* (2006.01)
*H04N 5/76* (2006.01)
*H04N 5/84* (2006.01)
*H04N 5/222* (2006.01)
*H04N 5/232* (2006.01)
*H04N 7/173* (2011.01)
*H04L 12/56* (2006.01)
*H04Q 11/00* (2006.01)
*G06K 5/00* (2006.01)
*G06K 19/06* (2006.01)
*G06F 1/00* (2006.01)
*G06F 3/00* (2006.01)
*G06F 9/34* (2006.01)
*G06F 13/00* (2006.01)
*G06F 13/14* (2006.01)
*G06F 15/00* (2006.01)

(52) U.S. Cl. ........ 386/338; 386/334; 235/380; 235/492; 345/473; 345/520; 348/211.3; 348/211.5; 348/231.99; 348/333.05; 348/722; 370/386; 370/389; 370/395.63; 370/400; 709/201; 710/10; 710/14; 710/16; 710/31; 711/103; 711/154; 711/158; 711/159; 711/165; 711/168; 711/203; 712/13; 712/15; 712/28; 713/323; 713/324; 725/92; 725/115

(58) Field of Classification Search ............... 386/96, 386/125, 126, E5.069, E9.013; 235/380, 235/492; 345/87, 473, 520; 348/211.3, 211.5, 348/231.99, 333.05, 722, E5.008, E5.043, 348/E5.051; 365/189.05, 189.02; 370/386, 370/389, 395.63, 400; 709/201; 710/10, 710/14, 16, 31; 711/154, 158, 165, 168, 711/103, 159, 203; 712/13, 15, 28, 104; 713/323, 324; 725/92, 115

See application file for complete search history.

(56) References Cited

U.S. PATENT DOCUMENTS

| | | | | |
|---|---|---|---|---|
| 6,195,350 B1 * | 2/2001 | Accarion | ...................... | 370/389 |
| 6,279,098 B1 * | 8/2001 | Bauman et al. | ................. | 712/13 |
| 6,774,935 B1 * | 8/2004 | Morimoto et al. | ......... | 348/211.5 |
| 6,850,444 B2 * | 2/2005 | Cho | ........................ | 365/189.05 |
| 7,016,601 B1 * | 3/2006 | Yoneya et al. | ................. | 386/96 |
| 7,191,296 B2 * | 3/2007 | Yoshii et al. | .................. | 711/154 |
| 7,543,122 B2 * | 6/2009 | Brown et al. | ................. | 711/158 |
| 7,643,731 B2 * | 1/2010 | Kobayashi et al. | ........... | 386/125 |
| 2001/0009446 A1 * | 7/2001 | Tarr et al. | ...................... | 348/575 |
| 2003/0038807 A1 * | 2/2003 | Demos et al. | ................. | 345/473 |
| 2003/0069510 A1 * | 4/2003 | Semler | .......................... | 600/509 |
| 2003/0191623 A1 | 10/2003 | Salmonsen | | |
| 2004/0054689 A1 | 3/2004 | Salmonsen et al. | | |
| 2004/0114622 A1 | 6/2004 | Nation et al. | | |
| 2004/0210608 A1 * | 10/2004 | Lee et al. | ...................... | 707/204 |
| 2005/0193162 A1 * | 9/2005 | Chou et al. | ................... | 711/103 |
| 2005/0194434 A1 * | 9/2005 | Trent, Jr. | ....................... | 235/380 |

FOREIGN PATENT DOCUMENTS

EP 1712985 A1 * 4/2005
JP 2001322078 A * 11/2001

OTHER PUBLICATIONS

Adtron—Smart Storage, Smart People, http://www.adtron.com/expertise/arraypro.html, Apr. 3, 2006, pp. 1-2.

Memory Card Camera-Recorder DVCPRO HD P2 Handheld, https://eww.pavc.panasonic.co.jp/pro-av/sales_o/p2/hvx200/index.html, Jun. 2, 2006, pp. 1-14.

\* cited by examiner

*Primary Examiner* — Thai Tran
*Assistant Examiner* — Syed Hasan (57) ABSTRACT

A portable data storage device compatible with both standard and high definition digital video cameras is provided. The device includes at least one SDI I/O, and preferably at least one audio I/O and preferably at least one medium speed I/O interface. A device controller takes the high speed serial data, packetizes it, and then sends it out to a plurality of memory modules. Preferably each memory module includes four NAND clusters, each NAND cluster consisting of a flash memory controller and two NAND flash memories. Interposed between the device controller and the memory modules are a plurality of memory controllers, each memory controller controlling a group of memory modules. A user interface is coupled to the device controller, the interface including a display capable of at least two user-selectable orientations, record/playback controls and a four-way directional control pad.

25 Claims, 7 Drawing Sheets

PORTABLE HIGH CAPACITY DIGITAL DATA STORAGE DEVICE

CROSS-REFERENCES TO RELATED APPLICATIONS

This application claims the benefit of U.S. Provisional Patent Application Ser. No. 60/790,132, filed Apr. 7, 2006, the disclosure of which is incorporated herein by reference for any and all purposes.

FIELD OF THE INVENTION

The present invention relates generally to data storage systems and, more particularly, to an apparatus for storing high speed, high capacity video data on a portable device.

BACKGROUND OF THE INVENTION

Traditionally movies, television programs, commercials, sporting events and most other forms of video data have been recorded using film-based systems. Although a variety of technical improvements in such systems have allowed film to remain the primary media for cinematography for the last hundred years, the advent of digital cinematography has started a gradual shift away from film and towards digital media.

Digital cinematography offers a number of advantages over film-based cinematography, not the least of which are smaller, lighter weight cameras and the ability to record both audio and video data onto a single media. From a production stand-point, of even greater importance is the ability to immediately play back a shoot rather than waiting for the film to be developed. Furthermore, since most films are currently edited on a digital system, shooting on digital video rather than film eliminates the lengthy telecine process required to convert film stock to digital video that can then be digitally edited. Lastly, hard disk drives or other digital media can hold considerably more footage than film at a fraction of the cost.

In order to take advantage of the shift to digital cinematography, a variety of technologies have undergone recent advances. To date, these advances have occurred primarily in the areas of cameras (e.g., resolution, improved dynamic range, calibration, frame rate, compression techniques, etc.) and editing hardware/software. However another area that requires improvement in order to garner wide spread acceptance is in the area of recording media. What is needed is a digital media device that is compact and light weight, thus allowing it to be easily transported and mounted directly to a camera, as well as being robust, compatible with a variety of camera systems (e.g., high definition, standard definition, etc.), capable of interfacing with both cameras and editing hardware, and user friendly. The present invention provides such a media system.

SUMMARY OF THE INVENTION

The present invention provides a portable data storage device compatible with both standard and high definition digital video cameras. The device includes at least one SDI input and one SDI output that can accept and output video data, respectively, in a variety of standard formats (e.g., SMPTE 259M, SMPTE 292M, SMPTE 296M, SMPTE 274M, SMPTE 372 dual link, etc.). In at least one embodiment the device also includes at least one audio I/O. In at least one embodiment the device also includes at least one medium speed I/O interface that is used to provide the user with captured video data via a medium speed interface (e.g., Ethernet, USB, PCIe-Link, SATA, etc.). In at least one embodiment the device also includes at least one high speed I/O interface that is used to provide the user with captured video data via a high speed interface (e.g., PCIe-Link, etc.).

A device controller, for example an FPGA or ASIC chip, takes the high speed serial data from the SDI input, converts the data to parallel data, packetizes it, and then sends it out via a plurality of medium speed data channels (e.g., LVDS channels) to a plurality of memory controllers and memory modules. By using only a subset of all of the memory modules at any one time, heat dissipation is improved and power consumption is lowered. Preferably each memory module is capable of storing at least 16 gigabytes and sustaining a data transfer rate of 60 megabytes per second. In a preferred embodiment each memory module includes four NAND clusters, each NAND cluster consisting of a flash memory controller and two NAND flash memories.

Preferably the memory modules are divided into several groups. For example in a preferred embodiment, the device includes two memory boards, each of which includes sixteen memory modules divided into four groups. Each group of memory modules is controlled by a separate memory controller (e.g., an FGPA or ASIC chip), the individual memory controllers being coupled to the device controller via the medium speed data channels.

In at least one embodiment of the invention, the device controller routes the incoming data into one of two buffer chips (e.g., DDR-II chips). Typically the incoming data first passes through one or more line equalization ICs. The buffers insure that the system is capable of handling the incoming data stream even if temporary performance lags are encountered in individual memory modules. During use, data is transferred into the buffers in an alternating fashion, thus allowing data to be input and stored in one buffer while the data in the second buffer is being read, packetized and sent to the memory modules.

In another aspect of the invention, a user interface is coupled to the device controller, the interface providing the user with a means of controlling the functions of the device as well as obtaining status information. Preferably the interface includes a display that is capable of displaying text in at least two user-selectable orientations. The other user controls such as record/playback controls and a four-way directional control pad can be used regardless of the device's orientation.

A further understanding of the nature and advantages of the present invention may be realized by reference to the remaining portions of the specification and the drawings.

DESCRIPTION OF THE SPECIFIC EMBODIMENTS

Figure 1:
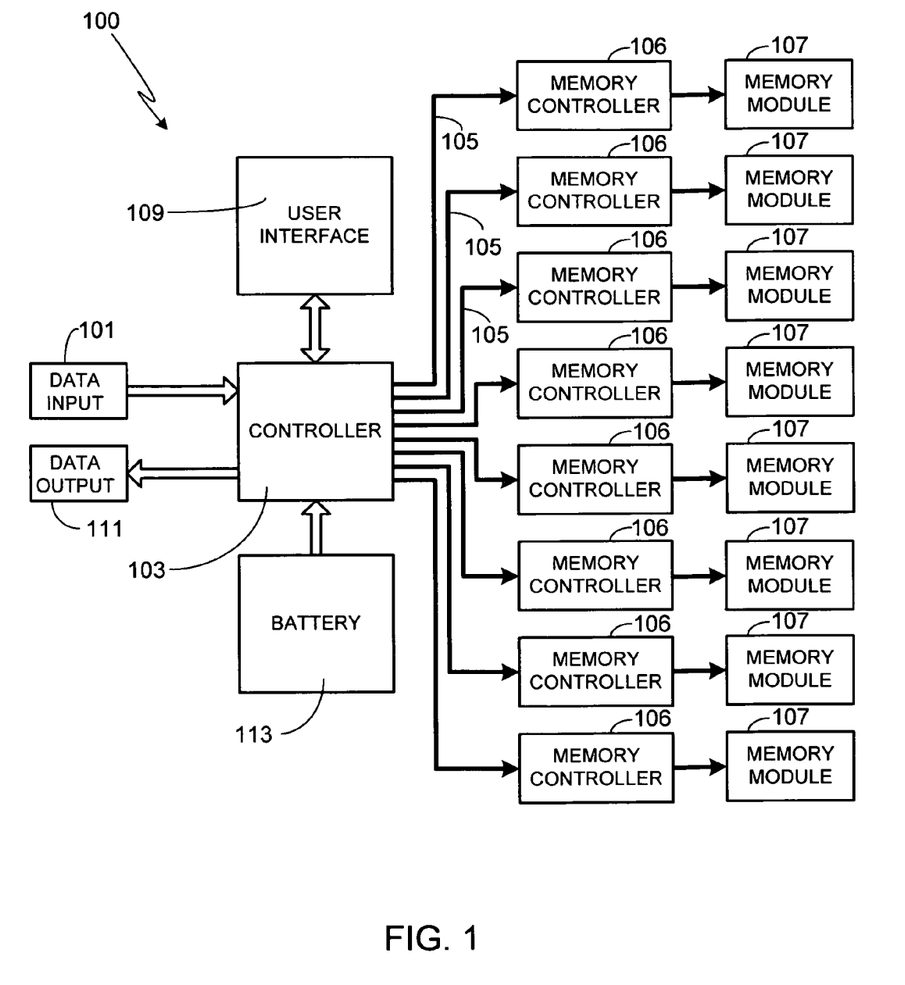
FIG. 1 is a high level block diagram of a data storage device designed in accordance with the present invention.

FIG. 1 is a high level block diagram of a data storage device 100 designed in accordance with the present invention. As shown, digital data is input through data input means 101, means 101 consisting of a serial digital interface (SDI). Although the digital data is not restricted to a specific format, typically system 100 will be coupled via input means 101 to either a high definition (HD) or a standard definition (SD) video camera and as such, data input means 101 (e.g., HD-SDI, SD-SDI, or other high speed interface) will receive video data in a standardized format (e.g., SMPTE 259M, SMPTE 292M, SMPTE 296M, SMPTE 274M, SMPTE 372M, etc.). Input means 101 can also include one or more audio input ports.

Controller 103 takes the high speed data from input means 101, packetizes the data, and then sends it out via data channels 105 to a plurality of individual memory controllers 106 and memory modules 107. Data channels 105 are preferably LVDS (low-voltage differential signaling) medium speed data channels. Memory modules 107 utilize NAND clusters. In at least one embodiment the system is designed to only utilize a subset of all of the memory modules 107 of system 100 at any given time, thus improving the heat dissipation within the unit as well as helping to minimize power requirements.

A user interface 109 is coupled to controller 103, interface 109 providing the user with the ability to control the functions of device 100, for example recording and playback, as well as providing status information (e.g., incoming/outgoing data status, memory use, battery life, etc.). Recorded data is output via output means 111. Preferably output means 111 includes both high speed serial outputs and low and/or medium speed serial outputs, the former used to output the data as recorded and the latter used to output data compatible with a personal computer (PC) or similar device. Device 100 can include an integrated battery 113 or battery 113 can be contained in a separate enclosure and coupled to device 100 via a power cable. Alternately device 100 can be coupleable to an alternate power source (e.g., line power) via a power cable.

Figure 2:
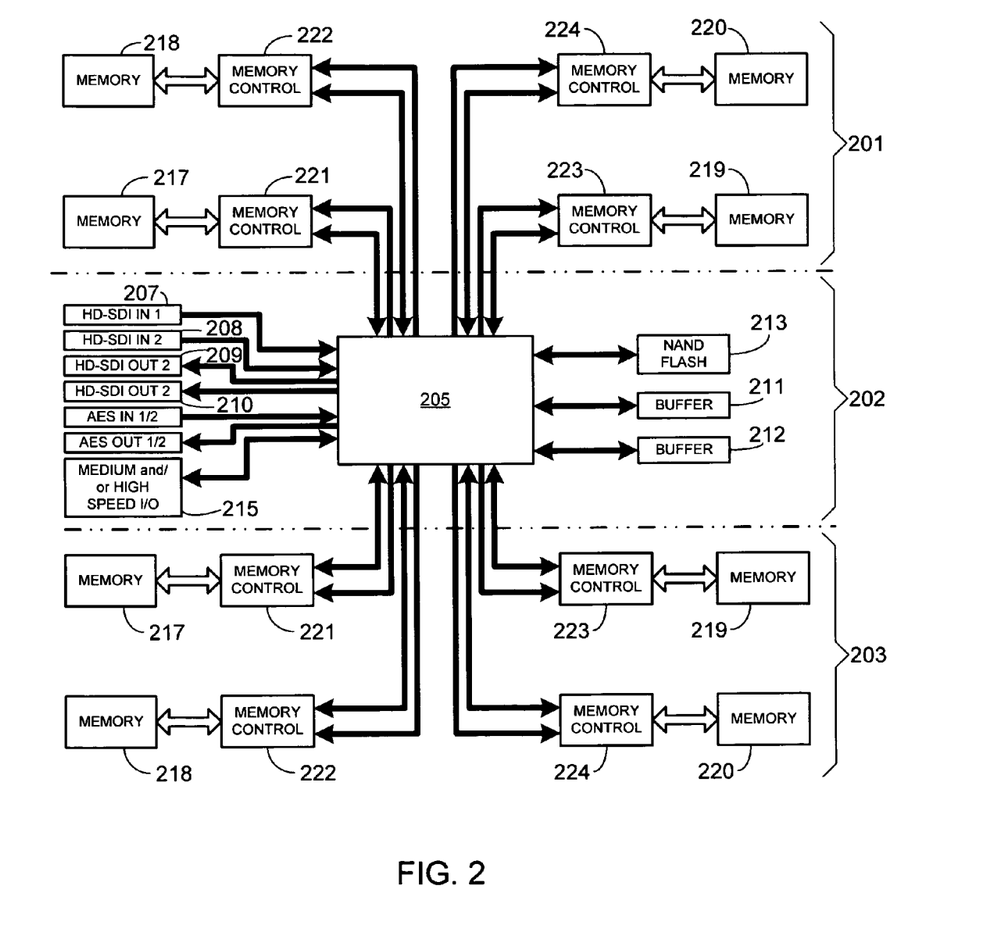
FIG. 2 is an overview of the system architecture.

FIG. 2 is an overview of the preferred system architecture, providing additional detail over that shown in FIG. 1. Preferably the circuitry is divided among three circuit boards 201-203 as shown, although both fewer and greater numbers of circuit boards can be used. In the illustrated embodiment, the higher order functionality is contained on primary board 202 while boards 201/203 contain the memory modules and related control circuitry. Note that boards 201/203 are identical and therefore the same component reference numbers are used for both. The use of multiple boards, as shown, provides an easy approach to after-market issues relating to either repairs or upgrades. Additionally, this approach allows multiple versions of the same device to be easily manufactured, for example where each version is configured for a different user (e.g., professional versus amateur user).

Preferably primary board 202 uses a single chip 205 (i.e., an integrated circuit or IC) as the primary controller, chip 205 handling the high speed I/O (in/out), mid-speed I/O and the various processing tasks. As chip 205 must accept the high speed serial incoming video stream and convert the data to parallel data, chip 205 preferably includes serializer/deserializer (SERDES) capabilities. Alternately a separate circuit/chip containing the SERDES capabilities can be coupled to chip 205. Chip 205 can be a field programmable gate array (FPGA) that includes embedded microprocessors and related peripherals, for example an Xilinx Virtex-II PRO or Virtex-4 device, or more preferably, an application-specific integrated circuit (ASIC). Although an ASIC does not have the flexibility of an FPGA, the higher speed and the lower power consumption of the ASIC makes it the preferred approach. Preferably the input data rate on inputs 207/208 and the output data rate on outputs 209/210 is 1.5 Gbps (gigabits per second), thus enabling the interface to handle SMPTE 292 on any single channel, or SMPTE 372 dual link on two channels.

In the preferred embodiment chip 205 routes the incoming data (e.g., from HD-SDI inputs 207/208) into one of two buffer chips 211/212. Typically the incoming data first passes through one or more line equalization ICs (not shown). Buffers 211/212 insure that if there is a temporary slow down in one or more individual memory systems, the incoming data rate remains high enough to handle the incoming data stream, thus compensating for temporary performance lags. Preferably buffers 211/212 are each capable of a minimum of 800 MBps (megabytes per second) bandwidth. To achieve the desired performance, preferably buffers 211/212 consist of DDR-II chips (second generation double data rate synchronous dynamic random-access memory). In use, data is transferred in an alternating fashion to buffers 211/212, thus allowing data to be input and stored in one buffer while the data in the second buffer is being read, packetized, and sent to the memory subsystems.

Main board 202 preferably also includes a NAND flash memory chip 213 that creates a file system, such as a FAT32 file system, on-the-fly during the storage process. This file system is then used to provide the user with captured video data on I/O 215, I/O 215 being either a medium speed I/O or a high speed I/O. It will be appreciated that the device can include both medium speed I/Os and high speed I/Os and that the device can include more than one interface. Exemplary interfaces including Ethernet, USB, PCIe-Link, SATA, etc. It should also be understood that in addition to providing the user with captured video data, I/O 215 can be configured to provide the user with remote control of the device.

Figure 3:
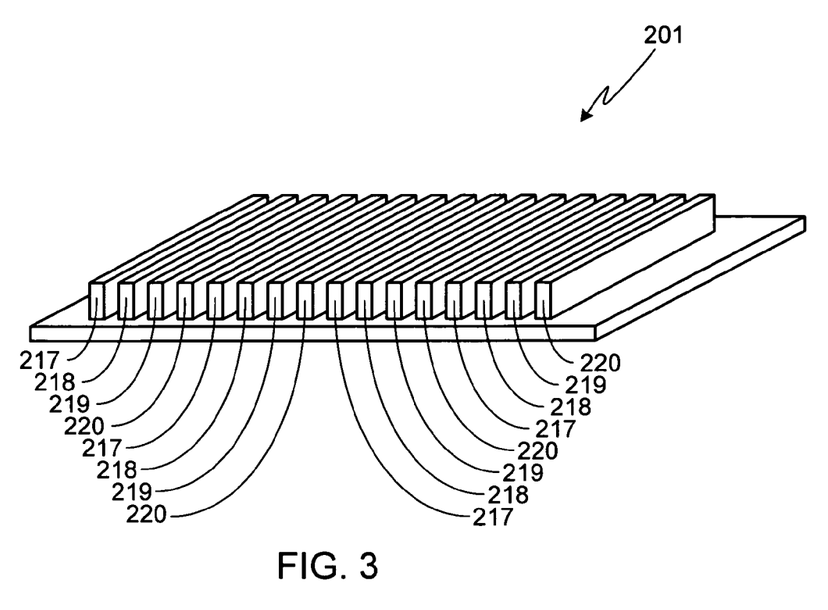
FIG. 3 is a perspective view of one side of a memory board, this view only showing the primary components.
Figure 4:
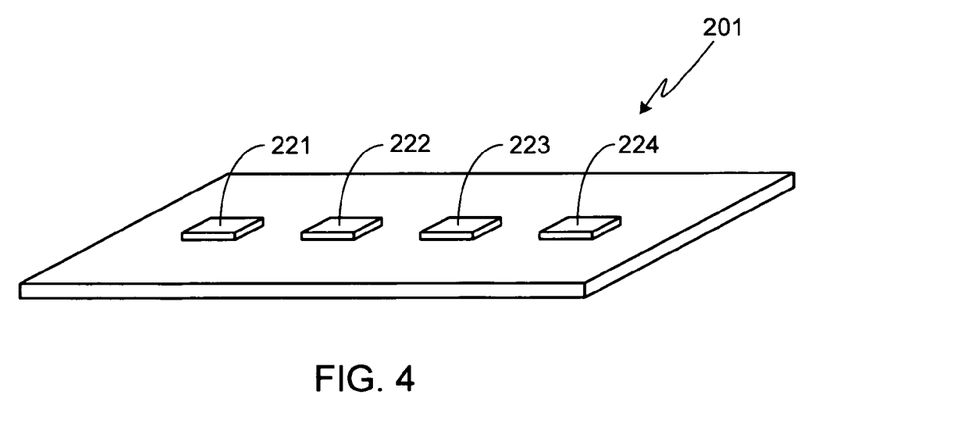
FIG. 4 is a perspective view of the second side of the memory board of FIG. 3, this view only showing the primary components.

Preferably memory boards 201/203 are identical, thus minimizing design and manufacturing costs. In the preferred embodiment, each memory board includes 16 identical memory modules although it will be appreciated that fewer or greater numbers can be used. The memory modules are divided into several groups, preferably four groups 217-220, in order to accomplish the desired data rate. As shown in FIGS. 3 and 4, preferably memory modules 217-220 are attached to one side of boards 201/203 while the memory control circuitry 221-224 is attached to the second side of the boards. Also as shown, preferably the memory modules for each group are interleaved. By interleaving the memory modules, if the system is configured to only actively access one group of memory modules at any given time as it is in at least one preferred embodiment, improved heat dissipation is achieved.

Each memory controller 221-224 consists of an FPGA or, more preferably, an ASIC chip, which receives one master clock input from primary chip 205. As shown in FIG. 3 and described above, each memory board 201/203 preferably includes four groups of four memory modules each, each group being controlled by one of the four memory controllers (i.e., four memory modules 217 controlled by FPGA, or ASIC, 221; four memory modules 218 controlled by FPGA, or ASIC, 222; four memory modules 219 controlled by FPGA, or ASIC, 223; and four memory modules 220 controlled by FPGA, or ASIC, 224). Preferably each memory module is capable of storing at least 16 gigabytes and sustaining a data transfer rate from its respective controller (i.e., one of controller 221-224) of 60 megabytes per second.

Figure 5:
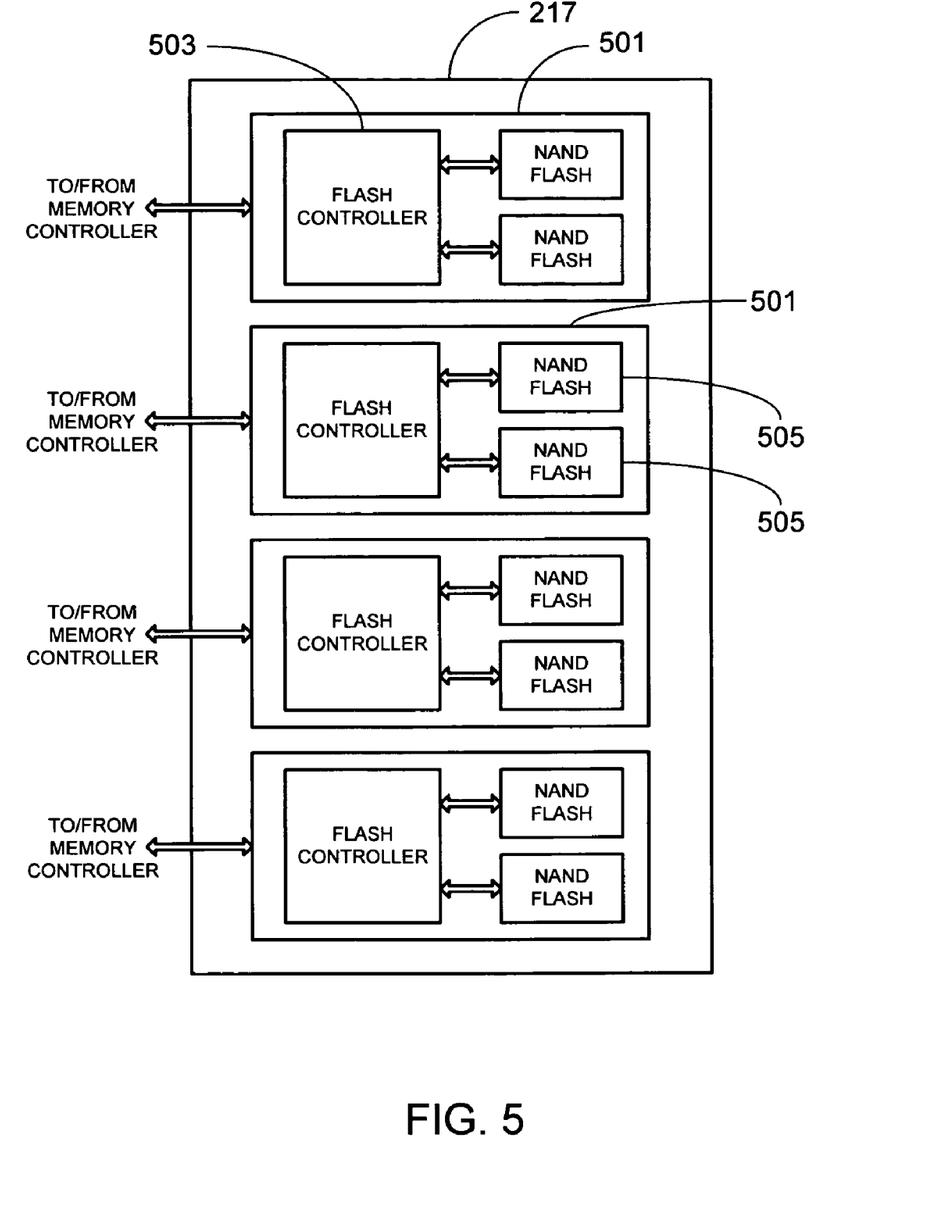
FIG. 5 is an illustration of a single memory module according to the preferred embodiment of the invention.

FIG. 5 is an illustration of a single memory module according to the preferred embodiment of the invention. Although the illustrated module is labeled 217, it will be understood that this module is representative of any of the sixteen identical memory modules contained on either board 201/203. Within each memory module are four NAND clusters 501, each NAND cluster preferably consisting of a flash memory controller 503 (e.g., a Hyperstone S4 flash memory controller) and 2 NAND flash memories 505. It will be appreciated that each NAND cluster can contain fewer or greater numbers of NAND flash memories 505. In at least one embodiment of the invention, each NAND flash memory 505 has 2 gigabytes of storage space. In the illustrated embodiment, since each memory module has four NAND clusters and there are four memory modules per FPGA (or ASIC) controller (i.e., controllers 221-224), each FPGA (or ASIC) controller must have sixteen individual channel memory controllers. As previously noted, each FPGA, or ASIC, 221-224 interfaces with primary FPGA, or ASIC, 205 via medium speed LVDS links.

Device Form Factor

Figure 6:
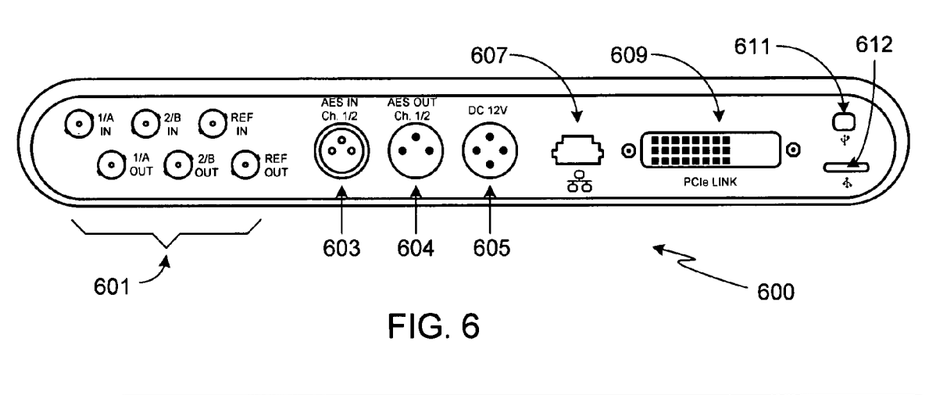
FIG. 6 is a front view of an exemplary device, this view of the housing showing the device connections.
Figure 7:
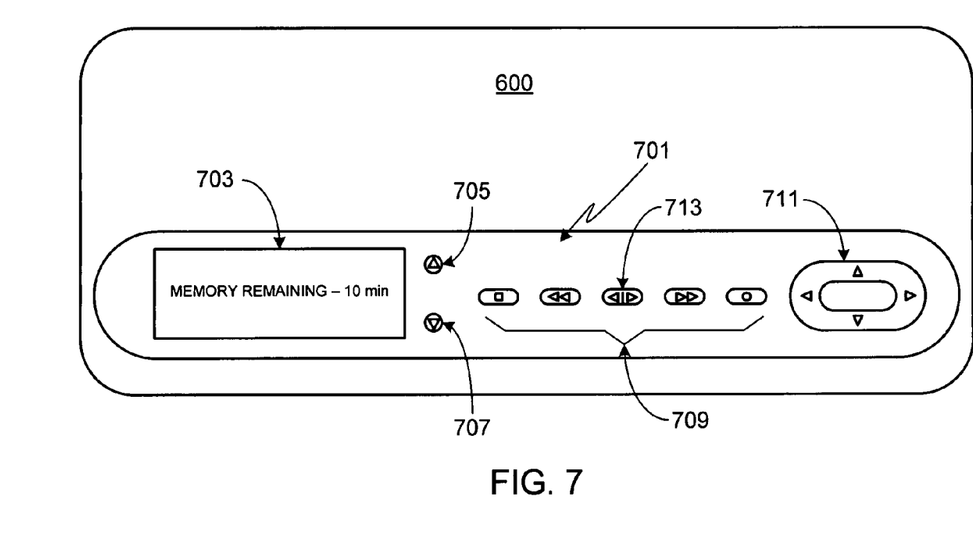
FIG. 7 is a top view of the exemplary device of FIG. 6, this view of the housing showing the preferred device interface.

It will be appreciated that the present invention is not restricted to a specific form factor. Accordingly, the embodiment illustrated in FIGS. 6 and 7 is simply an exemplary embodiment. FIG. 6 is a front view of device 600, this portion of the housing including the device connection ports. Preferably all connection ports comply with industry standards, thus insuring device compatibility. As previously noted, the device can include any of a variety of high speed and medium speed I/O ports. In the illustrated embodiment, the system includes six HD-SDI inputs 601 and a pair of AES ports 603/604. In at least one embodiment, device 600 includes an internal battery. Alternately, device 600 can rely solely on external power sources such as external battery packs, line voltage, etc. In the illustrated embodiment, device 600 includes a port 605 that can be used to couple the device to an external power source and/or recharge an internal battery, if used. Preferably the device also includes an Ethernet port 607, a PCIe Link 609, and a pair of USB 2.0 ports 611/612.

Figure 8:
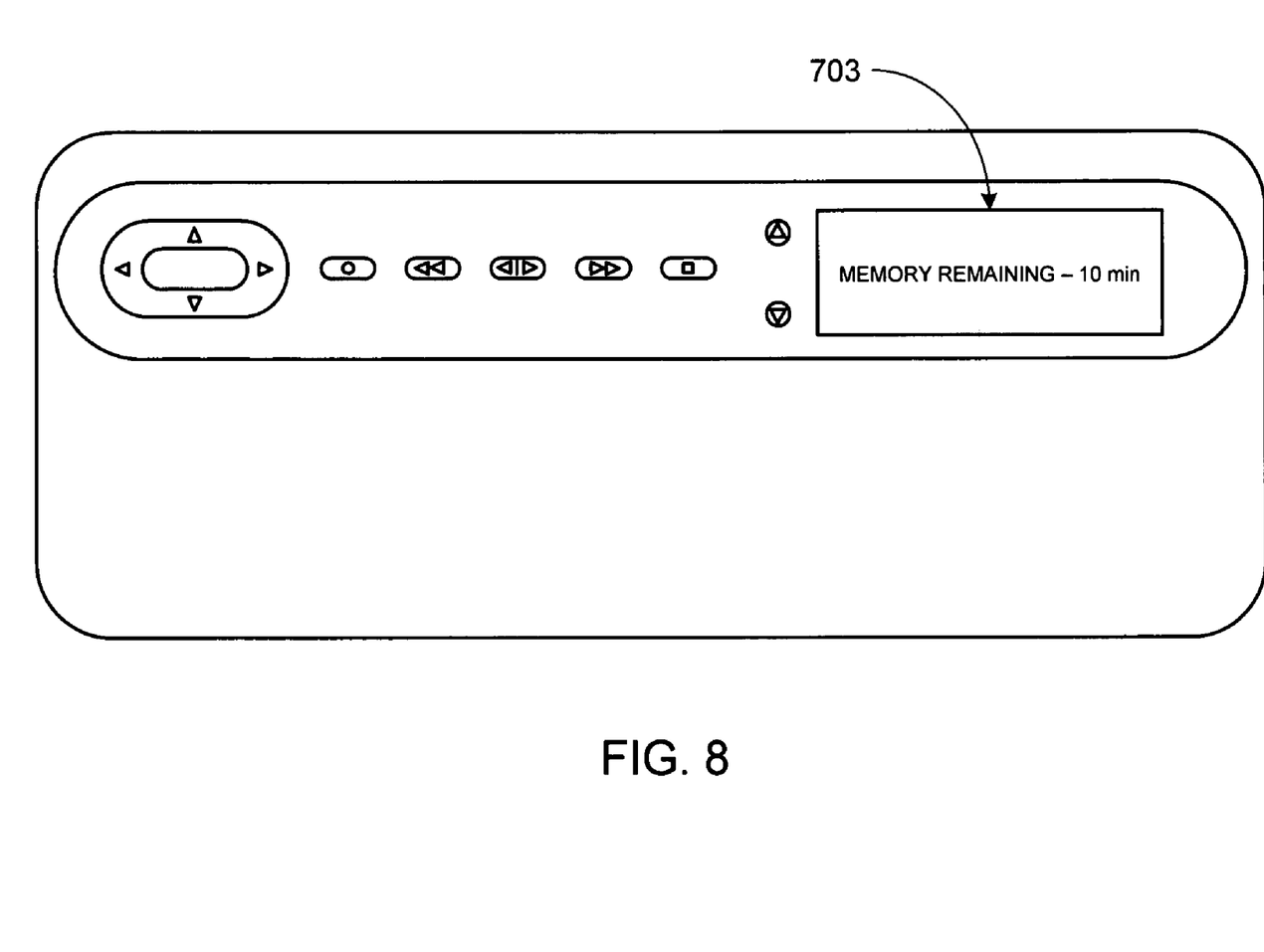
FIG. 8 is a top view of the exemplary device of FIGS. 6 and 7, this view showing an alternate orientation.

FIG. 7 illustrates a top view of device 600, this view showing the primary user interface 701 of the preferred embodiment. The interface includes a display panel 703 that provides the user with a simple means of configuring the device for the desired use as well as obtaining status information during use (e.g., memory used, remaining memory, battery life, etc.). As it is envisioned that the device will be used in a variety of orientations (i.e., mounted to the top of a camera, mounted within a camera tripod sleeve, held by the user with a shoulder strap, sitting on a desk while editing the recorded data, etc.), the display interface is configurable, thus allowing the user to select the desired orientation of the information displayed on panel 703. Specifically, and according to the preferred embodiment, by pressing either button 705 or button 707 the user is able to select between two possible display orientations, the displayed information being flipped 180 degrees depending upon which orientation the user selects. To clarify this aspect of the invention, FIGS. 7 and 8 show the same exemplary message ("Time Remaining—10 min") for each of the possible orientations. The user controls, specifically the record/playback controls 709 and the four-way directional control pad 711, can be used regardless of the device's orientation. Preferably "play" button 713 includes an internal light (e.g., an LED) that lights up one of the arrows on the button depending upon the orientation of the device (selected, for example, using buttons 705/707), thus allowing the arrow to always point to the user's right as is the common convention for a "play" button. Also preferably four-way directional control pad 711 includes a center 'enter' button.

Figure 9:
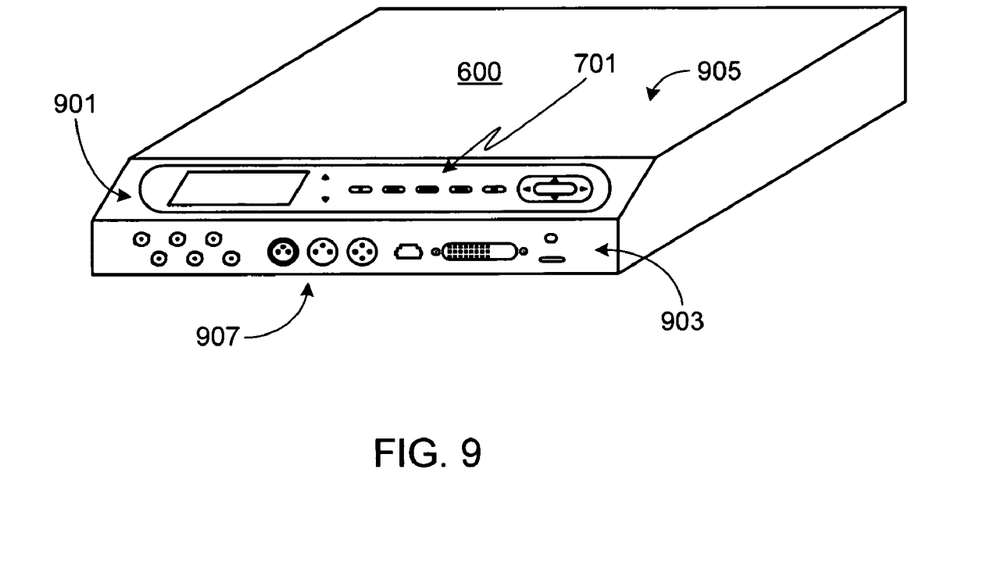
FIG. 9 is a perspective view of the exemplary device of FIGS. 6-8, this view showing an angled display.

In the preferred embodiment, and as illustrated in the perspective view of FIG. 9, the surface 901 of housing 600 which includes interface 701 is at a non-orthogonal angle to front housing surface 903, surface 903 containing the various device connection ports shown in FIG. 6. Surface 901 is also at a non-orthogonal angle to the top and bottom housing surfaces 905 and 907, respectively. Preferably surface 901 is at a 60 degree angle to surface 903 and at a 30 degree angle to surface 905. The inventors have found that by angling interface 701, display 703 as well as the various controls (e.g., controls 705, 707, 709 and 711) are accessible regardless of the orientation and mounting location of the device (i.e., on a desk top, mounted to a camera, mounted to a tripod, hanging from a shoulder strap, etc.).

As will be understood by those familiar with the art, the present invention may be embodied in other specific forms without departing from the spirit or essential characteristics thereof. For example, a variety of different housing and user interface configurations can be used. Also, the invention is not limited to a specific memory size or data rate. Also, the memory controllers can be incorporated into the primary controller, thus allowing the primary controller to communicate to the memory modules via either LVDS or TTL data channels. Accordingly, the disclosures and descriptions herein are intended to be illustrative, but not limiting, of the scope of the invention which is set forth in the following claims.

What is claimed is:

1. A video data storage device comprising:
   at least one high speed serial digital interface (SDI) video data input;
   a primary controller configured to accept serial video data from said high speed SDI video data input, said primary controller comprising a serializer/deserializer (SERDES) circuit, wherein said SERDES circuit converts said serial video data to parallel video data;
   a plurality of memory controllers coupled to said primary controller via a plurality of medium speed data channels;
   a plurality of NAND clusters coupled to said plurality of memory controllers, wherein said parallel video data is recorded in said plurality of NAND clusters;
   at least one high speed SDI video data output coupled to said primary controller, wherein said primary controller is configured to output said parallel video data recorded in said plurality of NAND clusters via said at least one high speed SDI video data output after said parallel video data is converted to said serial video data by said SERDES circuit; and
   a user interface coupled to said primary controller.

2. The video data storage device of claim 1, wherein each of said plurality of NAND clusters is comprised of a flash memory controller and at least one flash memory.

3. The video data storage device of claim 2, wherein each of said plurality of NAND clusters is comprised of at least two flash memories and said flash memory controller.

4. The video data storage device of claim 1, wherein said plurality of NAND clusters are grouped into a plurality of groups, wherein each group of said plurality of groups is comprised of at least four NAND clusters of said plurality of NAND clusters, wherein each of said plurality of NAND clusters is comprised of a flash memory controller and at least two flash memories, and wherein each group of said plurality of groups corresponds to one of a plurality of individual memory modules.

5. The video data storage device of claim 1, wherein said plurality of NAND clusters are grouped into a plurality of groups, wherein each group of said plurality of groups is comprised of at least two NAND clusters of said plurality of NAND clusters, and wherein each group of said plurality of groups corresponds to one of a plurality of individual memory modules.

6. The video data storage device of claim 5, further comprising at least one memory circuit board, wherein at least a portion of said plurality of individual memory modules are mounted to said at least one memory circuit board, wherein said portion of said plurality of individual memory modules are grouped according to memory controller such that each group of individual memory modules is coupled to one of said plurality of memory controllers, and wherein individual memory modules of each group are interleaved on said memory circuit board.

7. The video data storage device of claim 1, further comprising a battery coupled to said primary controller, said plurality of memory controllers and said plurality of NAND clusters.

8. The video data storage device of claim 7, further comprising a housing, wherein said primary controller, said plurality of memory controllers, said plurality of NAND clusters and said battery are all enclosed within said housing.

9. The video data storage device of claim 7, further comprising a housing, wherein said primary controller, said plurality of memory controllers and said plurality of NAND clusters are all enclosed within said housing and wherein said battery is coupled to said housing with a power cable.

10. The video data storage device of claim 1, wherein said at least one high speed SDI video data input is a high definition (HD) SDI video data input.

11. The video data storage device of claim 1, wherein said at least one high speed SDI video data input is a standard definition (SD) SDI video data input.

12. The video data storage device of claim 1, further comprising at least one audio data input and at least one audio data output.

13. The video data storage device of claim 1, wherein said plurality of medium speed data channels are low voltage differential signaling (LVDS) medium speed data channels.

14. The video data storage device of claim 1, wherein said primary controller is comprised of a first type of field programmable gate array (FPGA) device and wherein each of said plurality of memory controllers is comprised of a second type of FPGA device.

15. The video data storage device of claim 14, wherein said SERDES circuit is external to said first FPGA device.

16. The video data storage device of claim 1, wherein said primary controller is comprised of a first type of application specific integrated circuit (ASIC) device and wherein each of said plurality of memory controllers is comprised of a second type of ASIC device.

17. The video data storage device of claim 16, wherein said SERDES circuit is external to said first ASIC device.

18. The video data storage device of claim 1, further comprising at least two data buffers coupled to said primary controller, wherein said parallel data is temporarily stored in one of said at least two data buffers before being recorded in said plurality of individual NAND clusters.

19. The video data storage device of claim 18, wherein said at least two data buffers are comprised of double data rate synchronous dynamic random-access memory devices.

20. The video data storage device of claim 1, further comprising at least one NAND flash memory device coupled to said primary controller.

21. The video data storage device of claim 1, further comprising at least one medium speed data output.

22. The video data storage device of claim 1, further comprising at least one medium speed data input/output.

23. The video data storage device of claim 22, wherein said at least one medium speed data input/output is selected from the group consisting of Ethernet, USB, PCIe-Link and SATA interfaces.

24. The video data storage device of claim 1, further comprising at least one high speed data input/output.

25. The video data storage device of claim 24, wherein said at least one high speed data input/output is selected from the group consisting of Ethernet and PCIe-Link interfaces.

* * * * *